United States Patent [19]  [11] 3,724,416
Diamond et al.  [45] Apr. 3, 1973

[54] ELECTROSTATIC RESIN POWDER SPRAY SYSTEM HAVING IMPROVED POWDER DISPENSING MEANS

[75] Inventors: Harold G. Diamond, Wexford; Floyd L. Gustine, Pittsburgh, both of Pa.

[73] Assignee: Allis-Chalmers Manufacturing Company, Milwaukee, Wis.

[22] Filed: May 28, 1970

[21] Appl. No.: 41,229

Related U.S. Application Data

[63] Continuation-in-part of Ser. No. 722,078, April 17, 1968, abandoned, and a continuation-in-part of Ser. No. 728,253, May 10, 1968, abandoned.

[52] U.S. Cl. ...................... 118/7, 118/312, 118/603, 118/634
[51] Int. Cl. .............................................. B05b 5/02
[58] Field of Search.......... 118/312, 633, 7, 631, 308, 118/634, 603, 635, 627, 630, 326; 51/12, 8

[56] References Cited

UNITED STATES PATENTS

| | | |
|---|---|---|
| 847,269 | 3/1907 | Wise........................................51/12 |
| 3,446,184 | 5/1969 | Johnson................................118/7 X |
| 2,770,212 | 11/1956 | Marantz............................118/312 X |
| 3,299,853 | 1/1967 | Whitacre..............................118/312 |
| 2,759,449 | 8/1956 | Lindquist...........................118/312 X |
| 3,480,330 | 11/1969 | Hirs et al. ..........................118/312 X |
| 3,014,451 | 12/1961 | Rhodes...............................118/312 X |
| 3,439,650 | 4/1969 | Stowell..............................118/603 X |
| 3,100,724 | 8/1963 | Rocheville............................118/308 |
| 3,073,070 | 1/1963 | Mead......................................51/12 X |

FOREIGN PATENTS OR APPLICATIONS 329,940 5/1930 Great Britain....................118/312

Primary Examiner—John P. McIntosh
Attorney—Lee H. Kaiser, Robert B. Benson and Thomas F. Kirby

[57] ABSTRACT

An electrostatic spray system for resin coating metallic articles heated above the melting temperature of the resin and moved on a conveyor through a spray booth past spray nozzles for resin powder includes means for recovering and recirculating the overspray resin particles which do not come into contact with the heated article, a bin for the recovered resin powder containing a magnet and a vibrating screen for cleaning the power, a supply hopper below the recovered power bin having venturis at its lower end operated by a pressurized air source for controlling the supply of powder to the spray nozzles, means driven by a motor for delivering new powder to the supply hopper, and means for detecting the level of new and recirculated powder in the supply hopper and for energizing the motor only when the powder in the supply hopper is below a predetermined amount which will prevent agglomeration and compacting of the resin powder particles. In one embodiment a hopper for new resin powder is disposed above the supply hopper, a rotatable valve at the lower end of the new powder hopper is rotated by an electric motor and controls the amount of new powder delivered to the supply hopper, and the powder level detecting means controls the energization of the electric motor. In an alternative embodiment, a flexible screw conveyor driven by an electric motor controlled by the powder level detecting means delivers the new powder to the bin containing the magnet and vibrating screen to remove agglomerated particles and ferromagnetic particles from the new powder.

17 Claims, 10 Drawing Figures

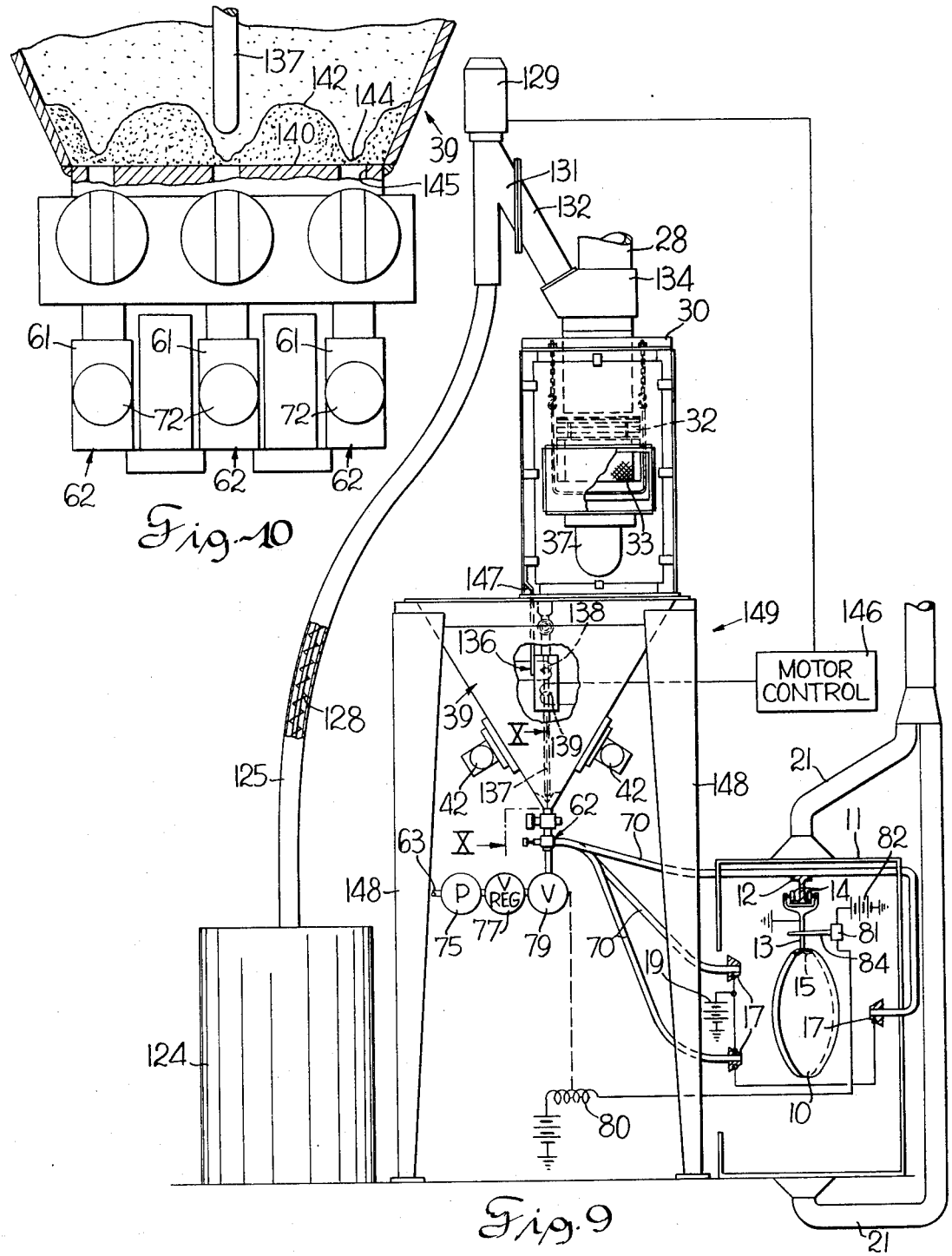

ELECTROSTATIC RESIN POWDER SPRAY SYSTEM HAVING IMPROVED POWDER DISPENSING MEANS

This application is a continuation-in-part of our present application Ser. No. 722,078, entitled "Electrostatic Resin Powder Spray System," filed Apr. 17, 1968, now abandoned, and also of our continuation-in-part application Ser. No. 728,253, filed May 10, 1968 having the same title, now abandoned.

This invention relates to apparatus for coating metallic articles with a resinous material.

The metallic covers of electrical apparatus such as distribution transformers are often covered with a relatively thick resin coating to prevent animals and birds for coming in contact with the metal and being electrocuted. The resin is conventionally a combination of specific materials such as epoxy resins and polyamide resins and is usually applied by a fluidized bed process in which the metallic article to be coated is heated to a temperature above the melting point of the resin and immersed into a fluidized powdered resin mass to cause the resin particles to melt and adhere to the heated metallic article and to flow into a smooth uniform resin coating on the article.

Resin powder particles may vary in size between 0.2 to 500 microns. The 0.2 micron sizes are easily airborne, and at constant air velocity they are quickly removed from the fluidized bed, leaving increasing amounts of coarse fractions behind. When the major amount left is coarse and cannot be airborne without greatly increasing the air velocity, "volcanoes" and "blowholes" occur which result in uneven coating and streaking of the resin coating on the metal article. The curing cycle for flowing out the powder into a uniform coating is sensitive to the presence of a sufficient volume of fine resin particles to initiate melting at a low and constant temperature, and the imbalance of particle sizes may change the curing cycle and necessitate scrapping of large amounts of resin powder.

This fluid flow separation of particle sizes is known as elutriation. It is a disadvantage in fluidized bed operations. Elutriation is avoided in the present invention by means for keeping the air flow and velocity constant for a given empirically determined small volume of mixed size particles so that all of the sizes are airborne and expelled through the spray gun before elutriative separation can occur. The overspray, which contains a higher proportion of coarse particles than virgin powder, is also kept to small increments for blending back into the small increments of virgin powder in the system so as to maintain a total volume for electrostatic spraying that contains a size distribution that will not suffer elutriative separation at the air volume and velocity employed. The invention thus preserves the "balance" of the powder sizing which is necessary for uniform and optimum resin coating.

Electrostatic spray resin coating systems are known which spray the resin powder from nozzles onto the heated article as it is moved relative to the nozzles. In known electrostatic spray resin coating systems the resin particles which do not contact the heated metal article, termed the "overspray," are collected and recirculated, the debris and dirt are removed from the recirculated powder in a separator, the recovered powder is introduced into a container such as a fluidized bed where it is mixed with new powder, and the resulting mixture is then fed into hoses leading to the spray nozzles. In addition to the fine particles settling in such fluidized bed, it was found that the recovered overspray contains agglomerated resin particles which tend to accumulate near the bottom of the bed. Such accumulation of agglomerated particles often grows until the entire contents of the bed, which may contain several hundred pounds of powder, must be scrapped.

Conventional electrostatic spray resin coating systems have numerous shutdowns and require the continued presence of an operator. Such shutdowns are usually caused by obstructions resulting from compaction of the powder which block circulation of the resin particles, and the expense of the continuous presense of an operator and the downtime of the spray coating apparatus substantially increases the cost of resin coating. Further the percentage of resin powder particles which are actually used in coating the metal article is relatively low in conventional systems, and the air surrounding such conventional spray systems is usually contaminated with the resin powder particles.

It is impractical in such an electrostatic resin spray coating system to shut off the powder, and the powder spray is controlled by shutting off the pressurized air. The resin powder is usually fed by gravity to the injection point in a venturi chamber and is carried away during the time that the air flows through the central jet in the venturi. When the pressurized air is shut off, the resin powder continues to flow by gravity and fills the venturi chamber and passages connected thereto. The extremely fine resin particles appear to continue to flow when the air is shut off and to compact on the walls of the venturi to the extent that they block the passageway for the powder after only a few days of operation. The extremely fine resin particles find their way into the screw threads behind the O-ring gasketed ram, which controls the amount of powder mixed with the air, so that they jam the threads and prevent adjustment of the ram. The resin particles accumulate and adhere to the walls of the venturi to such an extent that it is impossible to force sufficient powder through the venturi for spray coating even when the air pressure is raised from the normal operating range of 15–20 pounds per square inch to 90 pounds per square inch, and the powder adheres so tenaciously to the venturi walls that a cutting tool is required to remove the compacted particles.

We have found that an electrostatic spray resin coating system which utilizes a large volume of resin powder has many more shutdowns resulting from compacted powder obstructions than one which uses a small volume of powder; that the overspray contains a much higher percentage of coarse resin particles, i.e., of approximately 100 mesh size, than the new powder; that such overspray resin particles tend to clog the conventional powder separator and the main supply hopper which feeds the spray nozzles if a large volume is permitted to accumulate even when the overspray powder is mixed with new powder; that a high percentage of such coarse overspray particles in the powder fed to the spray nozzles changes the curing cycle of the resin and results in streaking and inferior coatings; that such coarse overspray particles settle and accumulate near the bottom of a fluidized bed used to feed the spray nozzles and result in feeding powder to the nozzles which does not have a uniform distribution of particle sizes and may necessitate scrapping of the entire bed; that the resin coating produced in a system having a fluidized bed feed for the spray nozzles often streaks and contains voids which make it unsatisfactory for applications where the coating must have high dielectric strength; and that an optimum resin coating without voids is obtained when a uniform distribution of powder particle sizes is fed to the nozzles which results in a coating having the closest possible packing of powder particles.

It is an object of the invention to provide an electrostatic spray resin powder coating system having improved powder dispensing means which prevents uneven coating and streaking of the resin as frequently occurred in prior art systems.

It is a further object of the invention to provide such an electrostatic spray resin coating system having improved powder dispensing means which prevents agglomeration and accumulation of the recovered powder, as often occurred in prior art systems, and which supplies a uniform blend of powder particle sizes to the spray nozzles at all times and produces an optimum and uniform coating without voids and streaking and having high dielectric strength.

Another object is to provide such an electrostatic spray resin powder coating system having improved powder dispensing means which maintains a constant proportion of clean recirculated powder to new powder and feeds a balanced mixture of resin particle sizes to the spray nozzles at all times.

Still another object of the invention is to provide such an electrostatic spray resin powder coating system having improved powder dispensing means which permits a minimum amount of powder to be used in the system and prevents accumulation of sufficient volume of powder to cause compaction of the powder and consequent obstruction of the system.

A still further object of the invention is to provide such an electrostatic spray resin powder coating system having improved powder dispensing means including venturis for controlling the flow of powder to the spray nozzles which prevent accumulation and adherence of the extremely fine powders and eliminate clogging of the venturis.

Still another object of the invention is to provide such an electrostatic spray resin powder coating system having improved powder dispensing means which controls the addition of new powder to the system as a function of the amount of new and recirculated powder in the supply hopper.

An object of one embodiment of the invention is to provide such an electrostatic spray resin powder coating system having improved powder dispensing means which conveys the new powder into the system directly from a shipping drum and removes agglomerated powder particles and ferromagnetic particles from the new powder.

These and other objects and advantages of the invention will be more readily apparent from the following detailed description when considered in conjunction with the accompanying drawing wherein:

FIG. 9 is an elevation view, partly schematic, of another alternative embodiment of our invention; and FIG. 10 is an enlarged partial view taken on line X—X of FIG. 9.

Figure 1:
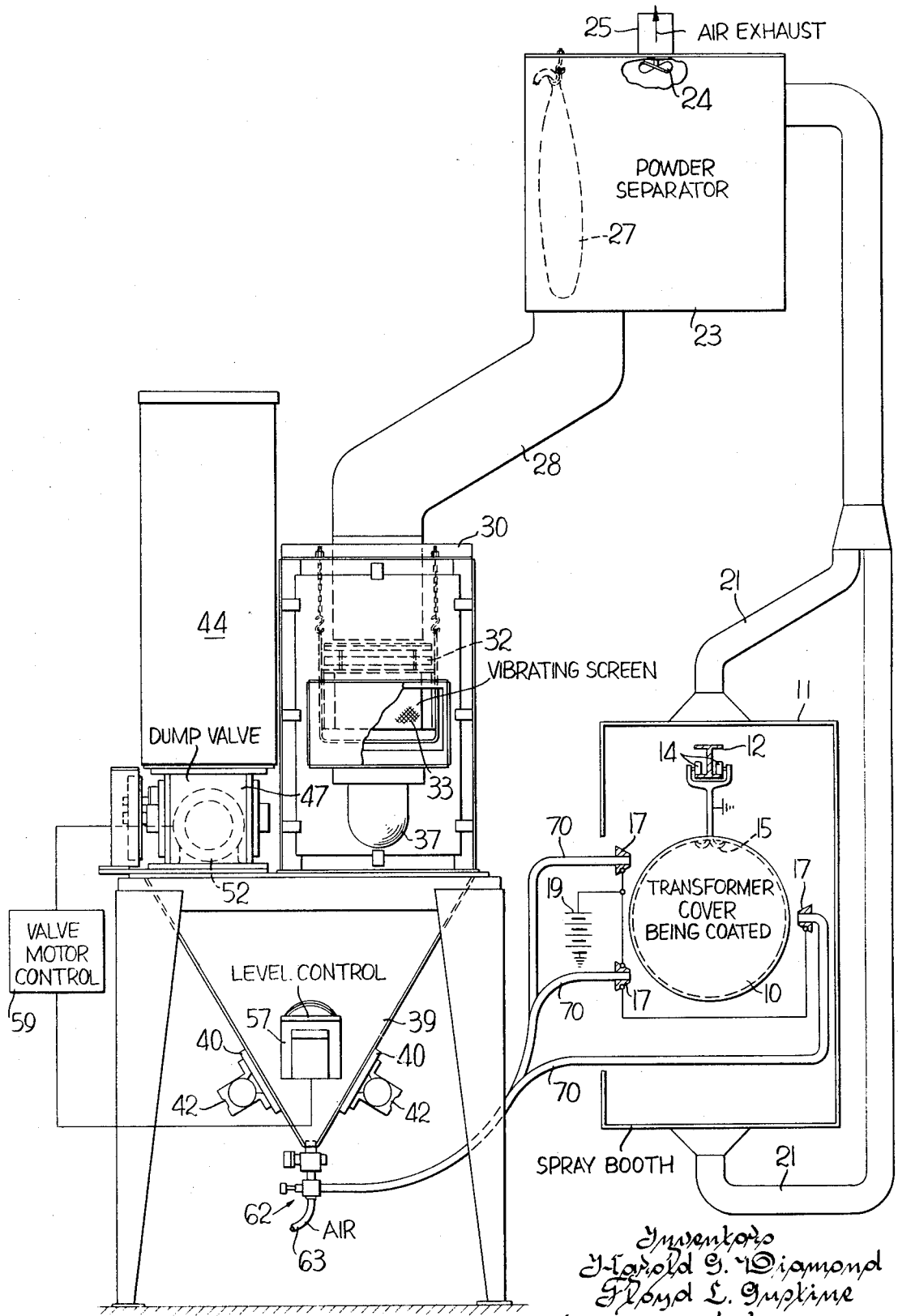
FIG. 1 is an elevation view, partially schematic, of an electrostatic spray resin powder coating system embodying our invention.

Referring to FIG. 1, the metallic article, or workpiece to be coated with resin is shown as a distribution transformer cover 10 which has been heated above the melting temperature of the resin to be applied and is being moved through a spray booth 11 on an overhead conveyor including an I-beam 12, movable support means 13 having wheels 14 engaging the lower flange of the I-beam 12, and hook means 15 depending from the movable support means and engaging the cover 10. The workpiece 10 is schematically shown to be grounded, and the resin particles accumulate an electrostatic charge as they pass through the spray nozzles 17, which are connected to a suitable high potential source shown schematically as a battery 19, and are attached to the grounded workpiece 10. The resin particles which do not contact the workpiece 10 are withdrawn through ducts 21 from the upper and lower ends of spray booth 11 vertically upward into a powder separator 23 by suitable air circulating means shown schematically as a fan 24 disposed at the entrance to an air exhaust duct 25 on the housing of separator 23. The recovered powder particles are returned by gravity from separator 23 through a duct 28 to a recirculated powder screening bin 30 where they pass through a grate type hopper magnet 32 which attracts any ferromagnetic particles therein. The recovered resin particles fall onto an inclined vibrating screen 33 actuated by an electromagnet 35, and any agglomerated resin particles or debris which do not pass through the screen 33 slide down the vibrating screen and fall into a sight glass container 37.

The recirculated resin powder particles which pass through screen 33 fall into a generally cone-shaped powder supply hopper 39. The walls defining hopper 39 are relatively flexible and are inclined at a steep slope and may have steel plates 40 welded thereto which are cyclically attracted by electromagnetic vibrators 42 to flex and vibrate the hopper walls and thus cause the powder to fall into the bottom of the hopper.

Figure 4:
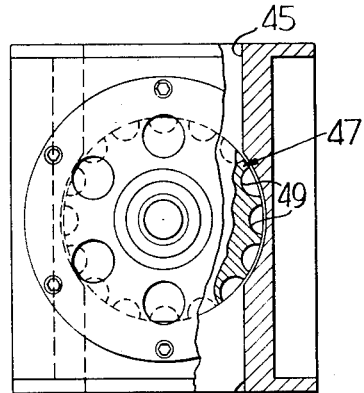
FIGS. 3 and 4 are front and side elevation views respectively of the dump valve of the apparatus of FIGS. 1 and 2 with portions broken away to better illustrate the internal construction.
Figure 3:
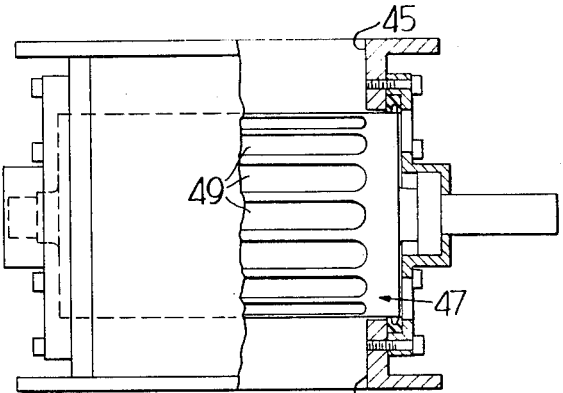
Figure 2:
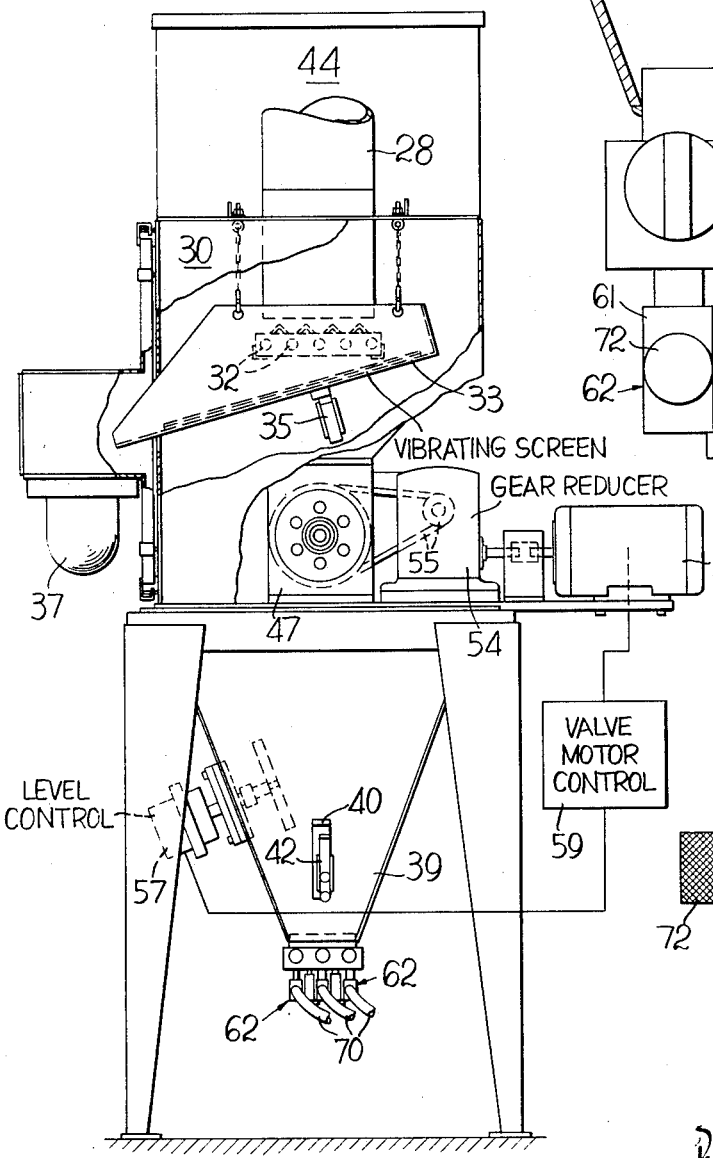
FIG. 2 is a side elevation view of the powder dispensing means of the system of FIG. 1.
Figure 5:
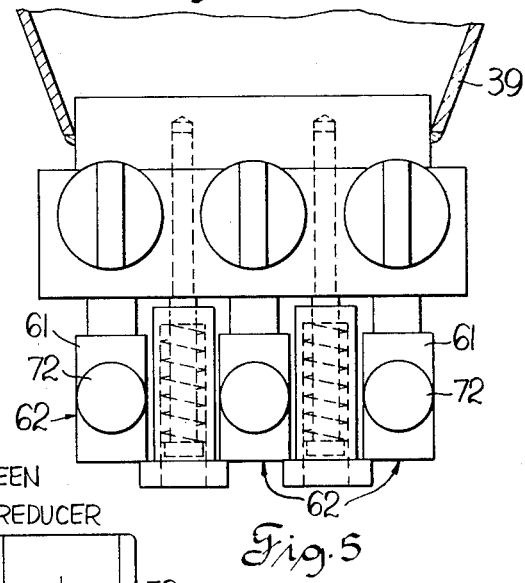
FIG. 5 is a front elevation view of the improved venturi means of the apparatus of FIG. 1.
Figure 6:
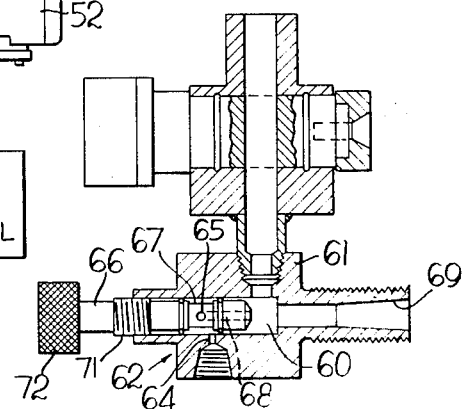
FIG. 6 is a section view through the venturi shown in FIG. 5.

The throat at the lower end of a new powder hopper 44 positioned adjacent the recirculated powder bin 30 registers with the aperture 45 (see FIG. 4) in the upper end of a motor-operated dump valve 47. Dump valve 47 is cylindrical and has a plurality of elongated powder receiving depressions 49 in its outer periphery which extend parallel to its axis. Dump valve 47 is rotated by an electric motor 52 through a suitable gear speed reducer 54 and belt and pulley means 55. The new resin powder is introduced into new hopper 44 and falls into the elongated powder receiving depressions 49 in dump valve 47, and the amount of new powder delivered through aperture 56 at the lower end of dump valve 47 into powder supply hopper 39 is determined by the rate of rotation of dump valve 47.

A bin level control 57 on a sidewall of powder supply hopper 39 provides an electrical output signal to a dump motor valve control means 59, shown schematically in block form, when the amount of new and recirculated resin powder in supply hopper 39 is below a level indicating that a predetermined amount of powder, preferably approximately 5 pounds, is in supply hopper 39. In response to the output signal from bin level control 57, valve control means 59 energizes motor 52 to rotate dump valve 47 and introduce new powder into supply hopper 39 until this predetermined amount is reached, at which time bin level control 57 removes the electrical signal to valve motor control means 59 to deenergize motor 52.

The mixture of new and recirculated resin powder in supply hopper 39 falls by gravity into the venturi chamber 60 within the housing 61 of each of a plurality of venturis 62. A suitable supply of pressurized air is connected by conduits 63 to the venturis 62, and the pressurized air flows through an air inlet passage 64 in each housing 61 and thence through a radial aperture 65 in an adjustable ram 66 disposed within a compartment in housing 61. Ram 66 has a smaller diameter portion 67 with O-ring gaskets at each end thereof which permits the air to flow into radial aperture 65 regardless of the ram position and thence through an axial aperture 68 in ram 66 into the venturi chamber 60 to force the resin powder out of chamber 60 through a diverging outlet passage 69 in housing 61 and into flexible hoses 70 connected to the venturis and to the spray nozzles 17. Ram 66 has external threads 71 which engage internal threads in housing 61 to permit axial movement of the ram 66 into and out of venturi chamber 60, when it is rotated by knurled knob 72, to control the amount of resin powder which mixes with the air.

The venturi housing 61 and ram 66 are preferably of an insulating plastic material such as polytetrafluorethylene having nonsticking properties. It has been found that venturis 62 constructed of such material substantially prevent adhesion and compacting of the fine resin powder and do not clog even after months of operation.

Figures 7, 8:
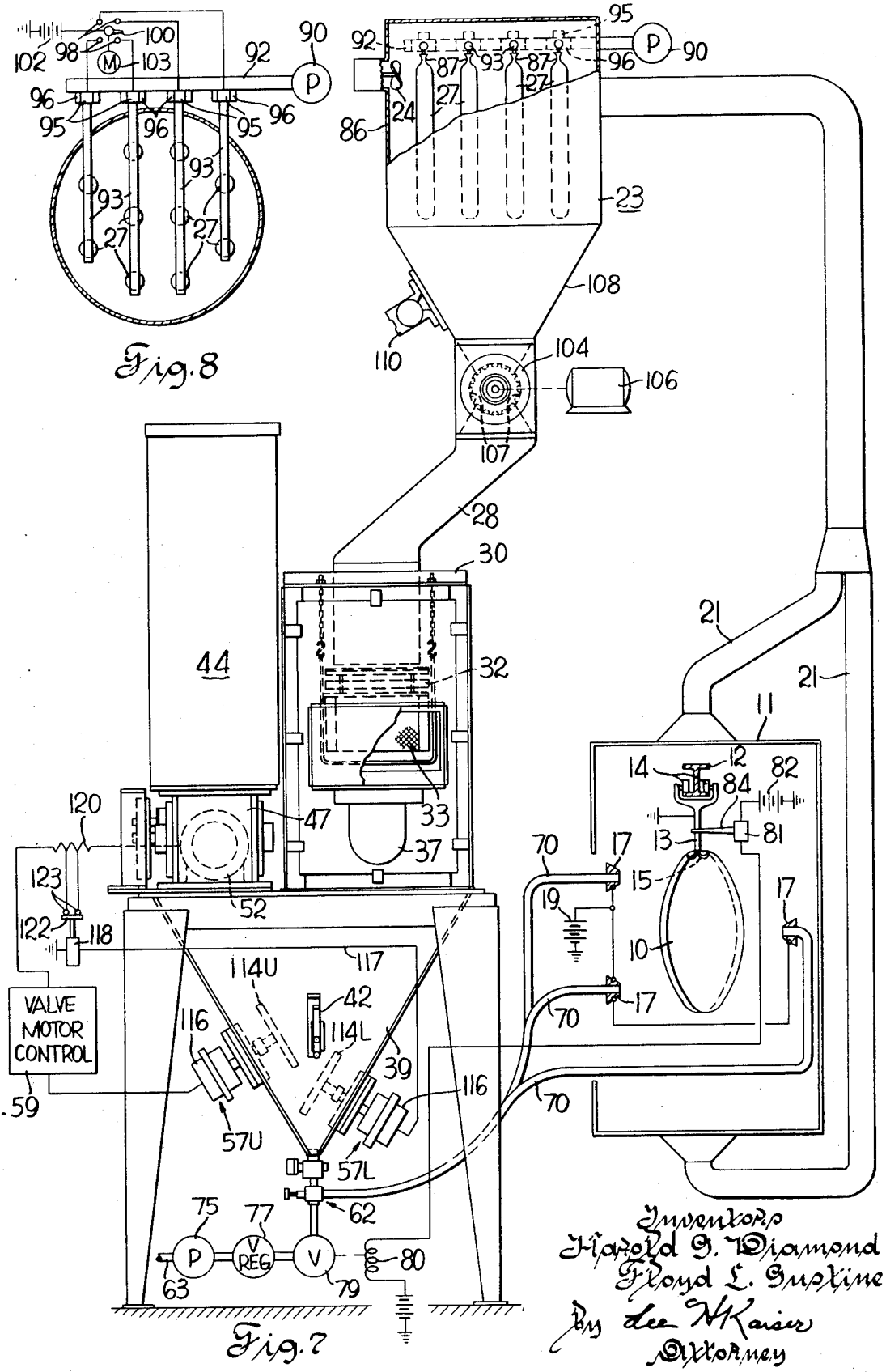
FIG. 7 is a elevation view, partly schematic, of an alternative embodiment of electrostatic spray resin coating system incorporating our invention.
FIG. 8 is a schematic plan view of the powder separator of the system of FIG. 7.

We have found that an electrostatic spray resin coating system which utilizes a large volume of resin powder has frequent shutdowns resulting from obstructions caused by compacted powder, and FIG. 7 illustrates an alternative embodiment of our invention which permits a smaller amount of powder to be in the system than the apparatus of FIG. 1–6, the elements similar to those of the system of FIGS. 1–6 being given the same reference numerals. The source of pressurized air is shown as a pump 75 connected to conduit 63 and an adjustable regulating valve 77 which may be adjusted to vary the pressure of air supplied to venturis 62 and thus control the volume of resin powder from the nozzles 17. Means schematically shown in FIG. 7 for minimizing the amount of resin powder in the electrostatic spray resin coating system includes a normally closed valve 79 in conduit 63 operable to open position by an electrical operating coil 80 to supply pressurized air to venturis 62 when the coil 80 is energized and means responsive to the presence of an article to be coated opposite the spray nozzles 17 for completing an energizing circuit to operating coil 80. The means for completing an energizing circuit to operating coil 80 is schematically shown as a normally open limit switch 81 in series with a source of electrical power 82 and the coil 80 and an operating arm 84 for switch 81 in the path of movement of the conveyor support means 13 adapted when engaged by support means 13 to operate limit switch 81 to closed position and thus complete the energizing circuit to coil 80 to thereby open valve 79 and supply pressurized air to venturis 62. It will be appreciated that such means will shut off the supply of resin powder when no workpiece 10 is opposite the spray nozzles 17 and thus minimize the amount of powder recirculated in the system.

The powder separator 23 preferably has a plurality of depending inflatable bags 27 within a housing 86. Each bag 27 has a fluid venturi opening 87 at the open upper end thereof, and means are provided to intermittently puff pressurized air into each bag 27 to inflate it and thus cause overspray resin particles that have settled on the bag to fall by gravity into the lower end of housing 86. The means for intermittently inflating bags 27 schematically shown in FIGS. 7 and 8 includes a source of pressurized air such as a pump 90, a manifold 92 receiving pressurized air from pump 90, a plurality of headers 93 each of which communicates with manifold 92 and is disposed above the open end of a plurality of bags 27 and has a plurality of orifices (not shown) therein each of which registers with the venturi opening 87 at the upper end of one of the bags 27, a normally closed valve 95 between each header 93 and manifold 92, a pilot valve 96 associated with each valve 95 having an operating coil (not shown) and being adapted to actuate the corresponding valve 95 to open position when its operating coil is energized, a rotary electrical switch having a plurality of stationary contacts 98 arranged in a circle with each stationary contact 98 connected by conductor means to the operating coil of one of the pilot valves 96, a movable contact 100 adapted when rotated to sequentially engage the stationary contacts 98 and being connected to one side of a source of electrical power 102, and means such as a motor 103 for rotating movable contact 100. It will be appreciated that when movable contact 100 rotates, the pilot valves 96 are sequentially operated for sufficient time to open the valves 95 and cause pressurized air to flow through the headers 93 and the orifices therein into the venturis opening 87 to intermittently inflate the bags 27.

A rotatable cylindrical dump valve 104 at the lower end of powder separator 23 is similar to dump valve 47 described hereinbefore and is continuously rotated by a motor 106 to prevent accumulation of sufficient overspray powder in separator 23 to result in compaction of the powder which might result in obstruction of the recirculation system. Cylindrical dump valve 104 is disposed between opposed, elongated, arcuate-in-cross section depressions 107 in the valve housing walls and has a close fit therewith which permits fan 24 to develop a relatively large negative pressure in housing 86 and ducts 21 to draw the overspray resin particles from booth 11 into powder separator housing 86. At its lower end powder separator housing 86 has a relatively flexible, inverted conical sidewall 108 of steep slope to prevent accumulation of the overspray resin particles, and electromagnetic vibrator means 110, similar to vibrator 42 on powder supply hopper 39, flex and vibrate the sidewall 108 to prevent accumulation and compaction of the powder.

The duct 28 between powder separator housing 86 and recirculated screening bin 30 is of steeper slope than shown in FIG. 7 to assure that the overspray resin particles do not accumulate.

The dispensing means for new powder shown in FIG. 7 are variable in speed. Two bin level controls 57L and 57U of the dynamometer type are mounted at different heights on the sidewall of powder supply hopper 39 and have paddle wheels 114 rotatable within supply hopper 39 by motor means 116. The output terminals of upper bin level control 57U are coupled to valve motor control 59, and the output terminal of lower bin control 57L is connected by a conductor 117 to the operating coil of a relay 118. When the new and recirculated overspray powder within supply hopper 39 is below a first predetermined amount, preferably three pounds, the paddle wheels 114L and 114U of both bin level controls 57U and 57L turn freely, no signal is provided to valve motor control 59, and control 59 energizes motor 52 through a resistance 120 to rotate dump valve 47 at a relatively high speed to deliver new powder to supply hopper 39. When the new and recirculated powder within hopper 39 reaches a level corresponding to said first predetermined amount, paddle wheel 114L of lower bin level control 57L is prevented from rotating by the powder, and control 57L provides an output to the operating coil of relay 118 which actuates its movable contact 122 relative to a pair of stationary contacts 123 connected to spaced taps on resistor 120 to thereby change the resistance in series with the field winding of motor 52 and slow down motor 52 and the speed at which dump valve 47 delivers new powder to supply hopper. When the new and recirculated resin powder reaches a level corresponding to a second predetermined amount which may result in compaction of the powder, preferably five pounds, paddle wheel 114U of upper bin control 57U can no longer rotate, and upper bin level control 57U provides an output signal to valve motor control 59 which opens the energizing circuit to motor 52 to thereby stop delivery of new powder to supply hopper 39 before a sufficient amount of powder can accumulate in supply hopper 39 to result in compaction of the powder. It will be appreciated that the disclosed new powder dispensing means also constitutes means for minimizing the amount of resin powder in the dielectric spray coating system.

FIGS. 9 and 10 schematically illustrate an embodiment of the invention which permits a still further reduction in the amount of resin powder in the electrostatic spray coating system and also further reduces the possibility of shutdowns caused by obstructions in the system. Coarse or agglomerated resin particles and ferromagnetic particles are removed from the new powder before it is introduced into the coating system. Elements of the system of FIGS. 9 and 10 similar to those of the embodiments of FIGS. 1–6 and FIGS. 7–8 are given the same reference numerals. The new powder hopper is eliminated in this embodiment, and new dry resin powder is conveyed from a drum 124 by a flexible tubular conduit 125 enclosing a screw conveyor 128 rotatable within tubular conduit 125 by an electric motor 129. The feed inlet end of the screw conveyor conduit 125 is inserted into the new powder within drum 124, and the discharge end 131 thereof communicates with a duct 132 registering with one inlet opening into a chamber 134. The chamber 134 has a second inlet opening in an upper wall thereof communicating with the duct 28 from the powder separator housing 86 and also has an outlet opening at its lower end communicating with recirculated powder screening bin 30. The new resin powder delivered from drum 124 by screw conveyor conduit 125 into duct 132 when motor 129 is energized falls by gravity onto the grate type hopper magnet 32 which attracts any ferromagnetic particles therein and then onto the inclined vibrating screen 33, and any agglomerated resin particles or debris mixed with the new powder do not pass through the screen 33 and slide down the vibrating screen 33 and fall into sight glass container 37.

The new powder particles and the recirculated powder particles which pass through screen 33 fall into the cone-shaped powder supply hopper 39. The powder level detector 136 of this embodiment preferably has an elongated vertical vibrating finger, or rod probe 137 positioned within hopper 39 slightly above the bottom wall 140 thereof. The lower end of rod probe 137 preferably depends below that level 142 of powder (see FIG. 10) to which the resin particles fall due to gravity and the vibration of the walls of hopper 39 by the electromagnetic vibrators 42 but above the powder level 144 in alignment with the apertures 145 leading to the venturi chambers 60 in housings 61 into which apertures the powder is drawn by negative pressure. Level detector 136 may be mounted on a bracket 147 affixed to a sidewall of recirculated powder screening bin 30 and may be of the type sold under the trademark DYNATROL described in Bulletin No. DJ–69 of Automation Products, Inc. of Houston, Tex. wherein an electric drive coil shown schematically at 138 drives rod probe 137 into self-sustained mechanical vibration at its natural resonant frequency when rod 137 is uncovered, and a pickup coil shown schematically at 139 is excited by the mechanical oscillations of the rod 137 and generates an alternating voltage signal when the level of powder in bin 39 is low and rod 137 is uncovered. This low powder level signal may operate a relay (not shown) in motor control 146 (illustrated in block form) which completes an energizing circuit to motor 129 to rotate conveyor screw 128 and thus deliver new powder from drum 124 into chamber 134.

When the powder within hopper 39 approaches level 142, for example, 1 inch to 2 inches above bottom wall 140, wherein the powder obstructs vibration of rod probe 137, dampening of the rod oscillations occurs, the magnitude of the rod oscillations is greatly reduced, and the output from the pickup coil 139 drops to such a low level that motor control 146 opens the energizing circuit to motor 129 to stop delivery of new powder by screw conveyor 125 to chamber 134. This powder level detector 136 is very sensitive and permits operation of the powder system of the invention with only one or two pounds of resin powder in the entire system without the powder level falling to the point where portions of the articles 10 are not covered by the resin.

In this embodiment, the length of the legs 148 of the support table 149 are shown to be of sufficient height so that the venturis 62 are raised above the level of the spray nozzles 17, thereby assuring that no U-shaped bends occur in the flexible hoses 70 between the venturis 62 and the spray nozzles 17 in which the resin powder particles can become compacted and cause obstructions.

Two types of thermosetting resins are used in electrostatic spray systems, namely, (1) the "dry blend," or "dry mix" type wherein the various resins and plasticizers are mixed separately in dry ball mills, and (2) the "melt mix" type wherein the resins, plasticizers and modifiers are all blended in liquid form, permitted to solidify upon cooling, and then ground into resin powder particles. The constituents of the dry blend type tend to separate out in the electrostatic system, thereby altering the properties of the deposited resin coating, whereas each particle of the "melt mix" type resin is of uniform consistency and the constituents are inseparable. The improved electrostatic spray system of the invention is operable with resin powders of either the "dry mix" or of the "melt mix" type.

The disclosed electrostatic spray resin coating system prevents obstructions resulting from compactions of resin powder and thereby substantially eliminates shutdowns of the apparatus. The disclosed apparatus does not require the continuous presence of an operator as was necessary with known resin coating equipment. The air surrounding the disclosed electrostatic spray apparatus is not contaminated with the resin powder. Only a very minute amount of the resin powder is not used in coating the workpiece in the disclosed apparatus. Further, the disclosed electrostatic spray coating system supplies a uniform blend of resin powder particle sizes to the spray nozzles at all times and produces an optimum and uniform coating without voids and streaking and which has high dielectric strength.

While only a few embodiments of our invention have been illustrated and described, many modifications and variations thereof will be readily apparent to those skilled in the art, and consequently it should be understood that we do not intend to be limited to the particular embodiments shown and described.

The embodiments of the invention in which an exclusive property or privilege is claimed are defined as follows:

1. In an electrostatic resin powder system for coating a metallic article, in combination,
    an electrostatic resin powder spray nozzle,
    means for electrostatically charging resin powder particles ejected from said nozzle,
    a supply hopper for new and recirculated resin powder,
    means communicating with said supply hopper for supplying resin powder from said hopper to said nozzle,
    means for recovering resin powder particles from said spray nozzle which do not contact said metallic article and for delivering them to said supply hopper,
    means for feeding new resin powder to said supply hopper, and
    level detecting means in said supply hopper for actuating said new resin powder feeding means to deliver new resin powder to said supply hopper when the amount of new and recovered resin powder in said supply hopper is below a predetermined magnitude.

2. In a system in accordance with claim 1 wherein said means for recovering includes a vibratory screen for removing coarse resin particles and said means for recovering delivers said recovered powder above said vibratory screen and said means for feeding new powder also delivers new powder above said vibratory screen.

3. In a system in accordance with claim 2 wherein said means for feeding new resin powder includes an electric motor and said level detecting means completes an energizing circuit to said motor to feed new resin powder to said supply hopper.

4. In a system in accordance with claim 3 wherein the walls of said supply hopper are flexible and including means for vibrating a wall of said hopper.

5. In a system in accordance with claim 3 wherein said means for feeding new powder includes a flexible conduit and a screw conveyor within said flexible conduit driven by said electric motor.

6. In a system in accordance with claim 5 wherein said level detecting means includes a vibrating rod probe depending to a predetermined level within said supply hopper, exciting electric coil means for driving said probe into self-sustained oscillations when said probe is uncovered, and pickup electric coil means for generating an output signal in response to oscillations of said rod probe.

7. In a system in accordance with claim 5 wherein said means for supplying resin powder to said electrostatic spray nozzle includes a venturi communicating with the lower end of said supply hopper, a conduit between said electrostatic spray nozzle and said venturi, and pressurized air supply means communicating with said venturi for propelling said powder through said conduit and said spray nozzle.

8. In an electrostatic powder coating system in accordance with claim 2 wherein said means for recovering includes continuously operating powder separator means which discharges recirculated powder collected therein above said vibratory screen.

9. In a system in accordance with claim 1 wherein said level detecting means includes a vibratory rod probe depending within said supply hopper, exciting electric coil means for driving said probe into self-sustained oscillations when said probe is uncovered, and pickup electric coil means for generating an output signal in response to oscillations of said rod probe.

10. In a system in accordance with claim 1 wherein said means for supplying new resin powder to said supply hopper is driven by a variable speed motor and also includes means for varying the speed of said motor as a function of the amount of new and recirculated powder in said supply hopper.

11. In a system in accordance with claim 1 wherein said means for supplying resin powder to said nozzle includes a venturi having a housing at the lower end of said supply hopper provided with a chamber registering with said supply hopper into which said resin powder in said supply hopper may fall, a conduit between said spray nozzle and said venturi housing in communication with said chamber, and pressurized air supply means for forcing said power out of said chamber and through said conduit and said spray nozzle.

12. In a system in accordance with claim 1 wherein said means for feeding new powder includes a flexible conduit, a screw conveyor within said flexible conduit, and an electric motor for driving said screw conveyor, and wherein said level detecting means competes an energizing circuit to said motor to feed new resin powder to said supply hopper.

13. In a system in accordance with claim 12 wherein said means for recovering includes a vibratory screen above said supply hopper, said screw conveyor discharges new powder above said vibratory screen, and said means for supplying resin powder to said electrostatic spray nozzle includes a venturi communicating with the lower end of said supply hopper, a conduit between said venturi and said nozzle, and pressurized air supply means communicating with said venturi for moving powder through said conduit and out of said nozzle.

14. In an electrostatic powder coating system in accordance with claim 1 wherein said means for recovering resin powder particles includes continuously operating powder collector means communicating with said supply hopper.

15. In an electrostatic resin powder system for coating a metallic article, in combination,
   an electrostatic resin powder spray nozzle,
   means for electrostatically charging resin powder particles ejected from said nozzle,
   means for maintaining said article at a potential which will attract said charged resin powder particles to it,
   a supply hopper for new and recirculated resin powder,
   means communicating with said supply hopper for supplying resin powder to said nozzle,
   means for recovering resin particles from said spray nozzle which do not contact said metallic article and for delivering them to said supply hopper,
   a supply bin for new resin powder,
   valve means between said bin and said supply hopper for controlling the amount of new resin powder delivered from said bin to said supply hopper,
   and level detecting means in said supply hopper for actuating said valve means when the amount of new and recovered resin powder in said supply hopper is below a predetermined magnitude.

16. In an electrostatic resin powder system for coating a metallic article, in combination,
   an electrostatic resin powder spray nozzle,
   means for electrostatically charging resin powder particles ejected from said nozzle,
   a supply hopper for new and recirculated resin powder,
   means communicating with said supply hopper for supplying resin powder to said nozzle,
   a bin for recirculated powder disposed above said supply hopper,
   means for recovering resin particles from said spray nozzle which do not contact said metal article and for delivering them to said bin for recirculated powder,
   a supply bin for new resin powder,
   valve means between said new powder bin and said supply hopper for controlling the amount of new resin powder delivered to said supply hopper, and
   level detecting means in said supply hopper for actuating said valve means when the amount of new and recirculated resin powder in said supply means is below a predetermined magnitude.

17. In a system in accordance with claim 16 and including a magnet and a vibratory screen in said bin for recirculated powder and wherein said means for recovering delivers said recovered powder particles above said magnet and said screen and said valve means includes a rotatable cylinder having elongated powder receiving depressions in its outer periphery parallel to its axis and an electric motor for rotating said cylinder and wherein said level detecting means controls said motor.

* * * * *